United States Patent

Park

[11] Patent Number: 5,828,516
[45] Date of Patent: Oct. 27, 1998

[54] METHOD OF DETECTING POSITION OF A HEAD OF DISK RECORDING SYSTEM USING A DIGITAL SERVO CONTROL METHOD

[75] Inventor: Sung-Yeoul Park, Seoul, Rep. of Korea

[73] Assignee: SamSung Electronics Co., Ltd., Kyungki-do, Rep. of Korea

[21] Appl. No.: 605,975

[22] Filed: Feb. 23, 1996

[30] Foreign Application Priority Data

Feb. 26, 1995 [KR] Rep. of Korea .................... 1995 3622

[51] Int. Cl.⁶ .................................................. G11B 5/596
[52] U.S. Cl. ............................ 360/78.14; 360/77.08; 360/78.04
[58] Field of Search ............................. 360/77.08, 78.14, 360/78.04, 78.08, 77.07, 77.02

[56] References Cited

U.S. PATENT DOCUMENTS

| | | | |
|---|---|---|---|
| 4,636,885 | 1/1987 | Yamada et al. | 360/78.14 |
| 5,041,926 | 8/1991 | Ockerse et al. | 360/77.05 |
| 5,268,800 | 12/1993 | Nielsen | 360/77.05 |
| 5,268,803 | 12/1993 | Sugita et al. | 360/77.08 |
| 5,311,379 | 5/1994 | Shinohara et al. | 360/77.02 |
| 5,339,207 | 8/1994 | Moon et al. | 360/77.05 |
| 5,381,281 | 1/1995 | Shrinkle et al. | 360/77.08 |
| 5,400,201 | 3/1995 | Pederson | 360/77.08 |
| 5,453,887 | 9/1995 | Negishi et al. | 360/77.01 |
| 5,600,506 | 2/1997 | Baum et al. | 360/78.14 |
| 5,602,693 | 2/1997 | Brunnett et al. | 360/77.08 |

*Primary Examiner*—Aristotelis M. Psitos
*Assistant Examiner*—Larry T. Cullen
*Attorney, Agent, or Firm*—Robert E. Bushnell, Esq.

[57] ABSTRACT

A servo control method of a disk recording system for detecting position of a head using a digital servo control method in which a disk contains an embedded burst recording region comprising four servo bursts. The servo control method contemplates on reading track identification information and servo burst information on the disk recording medium, determining whether a track on which the head is positioned is one of an odd and even track from the track identification information and the servo burst information, and generating an odd/even information bit and first and second position error signals in accordance with the determination; generating seek information from addition/subtraction to and from the odd/even information bit and the first and second position error signals; and correcting the track identification information in correspondence with the seek information and outputting a current position error signal.

27 Claims, 7 Drawing Sheets

*Fig.2B* BURST A

*Fig.2C* BURST B

*Fig.2D* PES (BURST A − BURST B)

*Fig. 2E*

LINEAR RANGE

P = BURST A − BURST B
P̄ = BURST B − BURST A

| Digphb | Digpha | Digodd | Skflg | OPERATION |
|---|---|---|---|---|
| 0 | 0 | 0 | 00 | PES2 |
| 0 | 0 | 1 | 01 | PES2<br>CURRENT GRAY CODE VALUE= GRAY CODE VALUE+1<br>(UPON FORWARD SEEK)<br>CURRENT GRAY CODE VALUE= GRAY CODE VALUE−1<br>(UPON REVERSE SEEK) |
| 0 | 1 | 0 | 02 | PES1 + 128 |
| 0 | 1 | 1 | 03 | PES1 − 128 |
| 1 | 0 | 0 | 04 | CHANGE SIGN PES1 − 128 |
| 1 | 0 | 1 | 05 | CHANGE SIGN PES1 + 128 |
| 1 | 1 | 0 | 06 | CHANGE SIGN PES2<br>CURRENT GRAY CODE VALUE= GRAY CODE VALUE+1<br>(UPON FORWARD SEEK)<br>CURRENT GRAY CODE VALUE= GRAY CODE VALUE−1<br>(UPON REVERSE SEEK) |
| 1 | 1 | 1 | 07 | CHANGE SIGN PES2 |

Fig. 5

METHOD OF DETECTING POSITION OF A HEAD OF DISK RECORDING SYSTEM USING A DIGITAL SERVO CONTROL METHOD

CROSS-REFERENCE TO RELATED APPLICATION

This application makes reference to, incorporates herein and claims all benefits accruing, under 35 U.S.C. §119 from an application for A Method Of Detecting Position Of A Head Of Disk Recording System Using A Digital Servo Control Method earlier filed in the Korean Industrial Property Office on the 24th of Feb. 1994 and there assigned Ser. No. 3622/1995.

BACKGROUND OF THE INVENTION

1. Technical Field

The present invention relates to a digital servo control method of a disk recording system, and more particularly to a method of detecting position of a head in the disk recording system using a digital servo control method and a disk recording medium containing an embedded burst recording region comprising four servo bursts.

2. Background Art

In a general disk recording system, a disk drive for storing data operates in two successive servo modes in accordance with the moving distance of a head. The first servo mode concerns with a seek mode in which a head accesses tracks of a disk to search for a target track and transition over the target track for reading and writing data on the target position. The second servo mode relates to a track following mode (TF mode) in which the head is accurately positioned on a data line of the target track after the head has reached the target track.

Control of the head position in a disk drive relative to the data line of the target track on the disk is therefore necessary to insure accuracy of the read and write operations. Conventional servo system for controlling the head position on the disk requires servo information in the form of magnetic burst patterns recorded on one or more servo sectors on each track on the surface of the disk. This servo information is read by the head during the servo operations at each servo sector and is used to a generate position error signal as a function of the misalignment between the head and the data line of each track (i.e., track centerline). This position error signal is then used to determine a servo compensation signal which controls the head actuator to place the head over the data line of each track.

One well known type of servo system such as disclosed, for example, in U.S. Pat. No. 5,339,207 for Servo System For Providing Increased Recording Density And Improved Operations Of The AGC Circuitry issued to Moon et al., involves recording a pattern of servo bursts of magnetic transitions radially displaced from each other in the servo sector. These servo bursts are typically designated as the "A" burst and "B" burst. Due to the radial displacement of the "A" burst relative to the "B" burst in a given servo sector, the "A" and "B" bursts are displaced on either side of the track centerline. When the head is positioned exactly over the data line of the target track, approximately one-half of the "A" burst will be read followed by one-half of the "B" burst in a time displaced fashion. As the head moves off the data line of the target track, the amplitude of one burst decreases while the amplitude of the other burst increases depending on the direction of the misalignment. In this manner, a position error signal can be derived from the relative amplitudes of the "A" and "B" bursts as the head passes over the "A" and "B" bursts and the difference in amplitude between the "A" and "B" bursts. Such a conventional servo system, however, has a number of drawbacks. Since the servo information is in-line with the sector data, the sector length available for storing user data is reduced. This requires for an expansion of data area on the track and reduction of servo code performance time. Moreover, since the average gap width of the head corresponds to approximately 80% to 90%, all data of each target track cannot accurately be reproduced without an error, and the position error signal cannot be reliably detected.

Another well known analog servo control technique such as disclosed, for example, in U.S. Pat. No. 5,041,926for Track Position Syncopation Cancellation In A Disk Drive issued to Ockerse et al., and U.S. Pat. No. 5,311,379 for Method And System For Positioning Head On Target Cylinder Of Disk issued to Shinohara et al., relates to an embedded servo pattern in which four servo bursts are used to position the head on a target track of a disk. This analog servo control technique however requires high production cost in relative to a digital servo control technique as contemplated by the present invention. Moreover, the position error signal detection in the conventional analog control technique is not always reliable, and the alternation of servo parameters during the production process is not easily implemented in comparison with the digital servo control method.

Other servo control methods using a servo pattern of four servo bursts or a group of a plurality of servo bursts such as disclosed, for example, in U.S. Pat. No. 5,268,800 for Disk Drive Servosystem Using Gray Code issued to Nielsen et al., U.S. Pat. No. 5,268,803 for Disc Memory Apparatus Utilizing Detection Of High-Accuracy Address Data In Short Servo Sectors For High Speed Addressing issued to Sugita et al., U.S. Pat. No. 5,381,281 for Disk Drive System Using Multiple Embedded Quadrature Servo Fields issued to Sugita et al. U.S. Pat. No. 5,400,201 for Servo Burst Pattern For Removing Offset Caused By Magnetic Distortion And Method Associated Therewith issued to Pederson, illustrate several alternatives and improvements over the well known analog servo control technique. While these servo control systems certainly possess their own merits, it has been my observation that further improvement on a digital servo control system for controlling the head positioning on a disk recording medium can be contemplated.

SUMMARY OF THE INVENTION

Accordingly, it is an object of the present invention to provide an improved circuit and process for detecting position of a head on a disk using a digital servo control system.

It is also an object to provide an improved servo control process and system for a head actuator in a disk drive which is less complex and less costly to manufacture.

It is also another object to provide an improved circuit and process for detecting position of a head on a disk using a digital servo control system in which the disk contains a servo pattern comprising four servo bursts for controlling the head position.

These and other objects of the present invention can be achieved by an improved circuit and process for detecting position of a head in a disk recording system using a digital servo control method in which a disk recording medium has a servo burst recording region comprising a plurality of servo bursts. The practice of this invention contemplates upon reading track identification information and servo burst information on the disk recording medium; determining whether a track on which the head is positioned over is one of an odd and even track from the track identification information and the servo burst information, and generating an odd/even information bit and first and second position error signals in accordance with such a determination; generating seek information based on the addition/subtraction of the odd/even information bit and the first and second position error signals; and correcting the track identification information in correspondence with the seek information and outputting a current position error signal.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 3A to 3I are flow charts illustrating a preferred embodiment of the present invention, wherein

DETAILED DESCRIPTION OF THE PREFERRED EMBODIMENT

Figure 1:
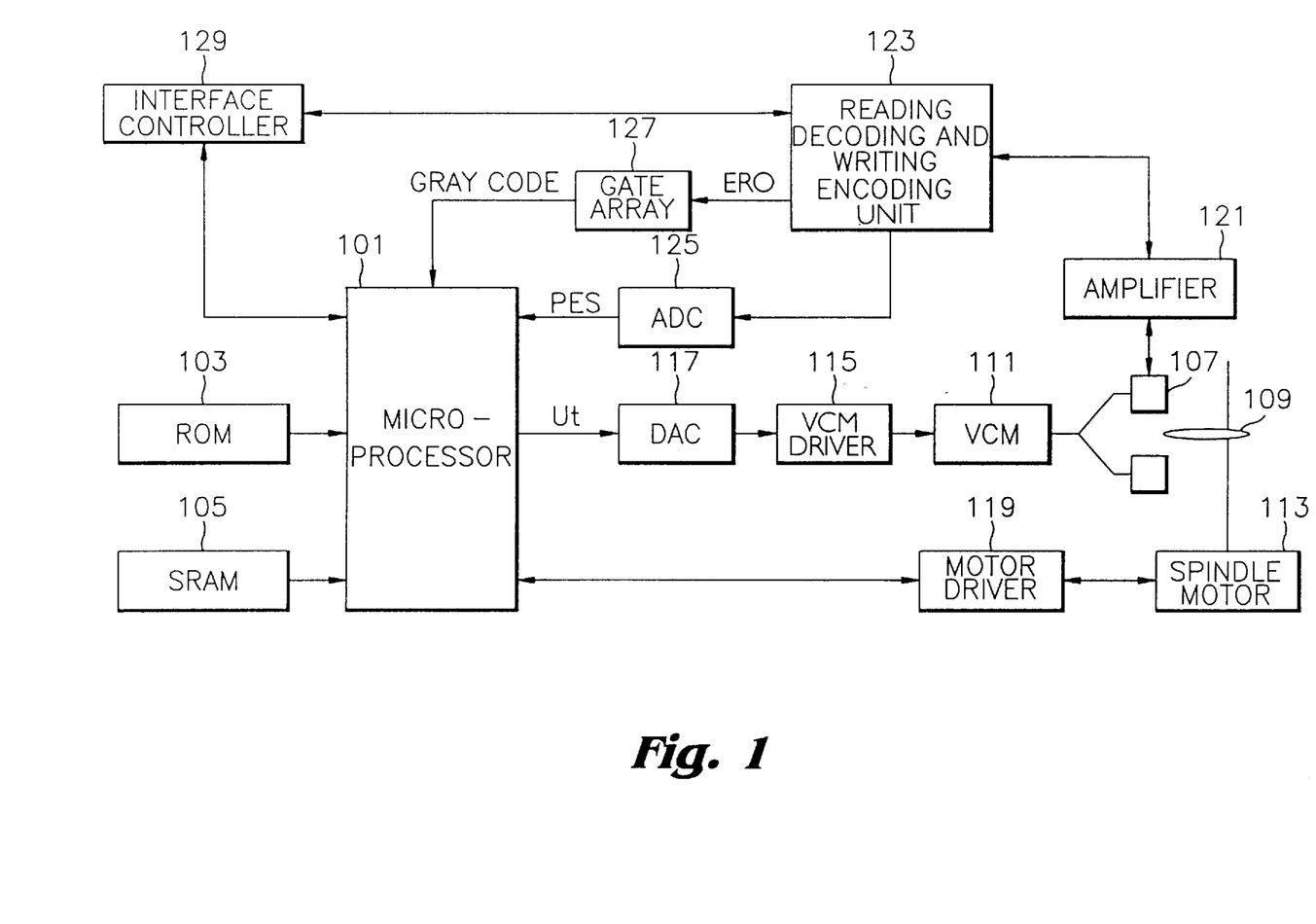
FIG. 1 illustrates a servo control configuration of a general disk recording system constructed according to the principles of the present invention.

Referring now to the drawings and particularly to FIG. 1, which illustrates a servo control configuration of a disk recording system constructed according to the principles of the present invention. This servo control configuration is described in detail in Applicant's co-pending related application for Digital Servo Control Apparatus And Method Of Data Storage System Using Disk Recording Media, earlier filed on 17 Nov. 1994 and assigned with Ser. No. 08/343, 939, which is incorporated herein by reference. For purposes of completeness however, the pertinent portions of that earlier filed co-pending application are set forth below.

In the preferred servo control configuration of the present invention as shown in FIG. 1, a microprocessor 101 is connected to a programmable read only memory 103 (hereinafter, PROM) which stores a control program executed in the microprocessor 101 and a static random access memory 105 (hereinafter, SRAM), respectively. A head 107 performs a horizontal movement on a disk 109 as a recording medium, and reads/writes data at a target position on the disk 109. A voice coil motor 111 (hereinafter, VCM) serves as an actuator and is connected to the head 107 to thereby activate the head 107 in the horizontal direction on the disk 109. A spindle motor 113 serves as a disk rotating device and is connected to the disk 109 at its own driving axis, thus to rotate the disk 109. A VCM driver 115 is connected to the VCM 111 and controls the activation thereof.

A digital-to-analog converter (hereinafter, DAC) 117 is connected to the microprocessor 101 and the VCM driver 115, respectively. The DAC 80 receives a digital control signal Ut from the microprocessor 101, converts the digital control signal into an analog form and provides an analog-converted signal to the VCM driver 115. A motor driver 119 is connected to the spindle motor 113 and the microprocessor 101 respectively, and controls the activation of the spindle motor 113 under the control of the microprocessor 101. An amplifier 121 is connected to the head 107, amplifiers a signal read by the head 107, and outputs the amplified signal. Additionally, the amplifier 121 amplifies an input signal to be written and outputs the amplified input signal to the head 107. An interface control unit 129 transmits and receives data to/from an external data input device (not shown) under the control of the microprocessor 101. A reading decoding and writing encoding unit 123 is connected to the microprocessor 101, the amplifier 121 and the interface control unit 129. Under the control of the microprocessor 101, the reading decoding and writing encoding unit 123 receives writing data from the interface control unit 129 and encodes the data to an analog flux conversion signal, thereby outputting the signal to the amplifier 121. The reading decoding and writing encoding unit 123 also converts the analog reading signal received from the amplifier 121 into digitally encoded read data (hereinafter, ERD signal) for decoding and outputting the ERD signal as read data.

An analog-to-digital converter (hereinafter, ADC) 125 is connected to the reading decoding and writing encoding unit 123, from which the ADC 125 receives the analog servo reading signal and converts the received signal into the PES for output to the microprocessor 101. A gate array 127 is connected to the reading decoding and writing encoding unit 123 and receives the ERD signal therefrom. Thus, the gate array 127 outputs from the ERD signal each servo information detection and timing clock detection of a gray code within the servo area of the disk 109. In the construction as described above, the microprocessor 101 executes the overall control operation in a servo control apparatus of the disk recording system.

Figure 2A:
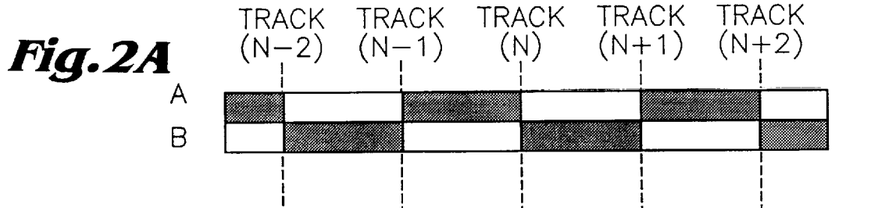
FIGS. 2A to 2E are timing diagrams illustrating the burst recording state and the position error signal generation of a conventional servo control method.
Figure 2B:
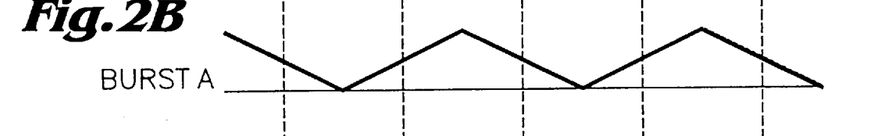
Figure 2C:
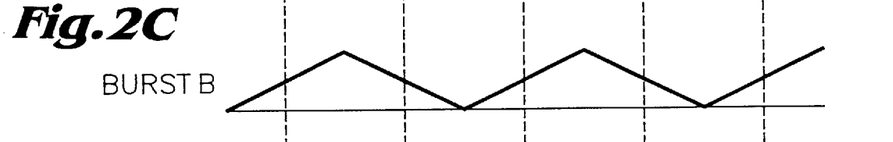
Figure 2D:
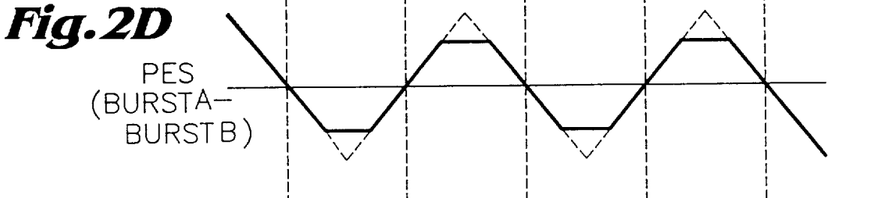

FIGS. 2A to 2E are timing diagrams illustrating the burst recording state and the position error signal generation of a conventional servo control method using a two burst embedded pattern on a disk comprising "A" and "B" bursts. Typically, the disk of the general disk recording system contains an embedded burst recording region where recording states of servo bursts "A" and "B" alternate in the half form as shown in FIG. 2A on the basis of the centerline of each track. When the head 107 of FIG. 1, for example, is positioned exactly on the data line of a target track, the read-out values from the servo bursts "A" and "B" are the same. For example, FIG. 2B and FIG. 2C illustrate waveforms the read-out values of the servo burst "A" and "B" when the head 107 is positioned exactly on the data line of a target track. FIG. 2D illustrates a waveform of position error signal generated based on a difference between the servo bursts "A" and "B".

Figure 2E:
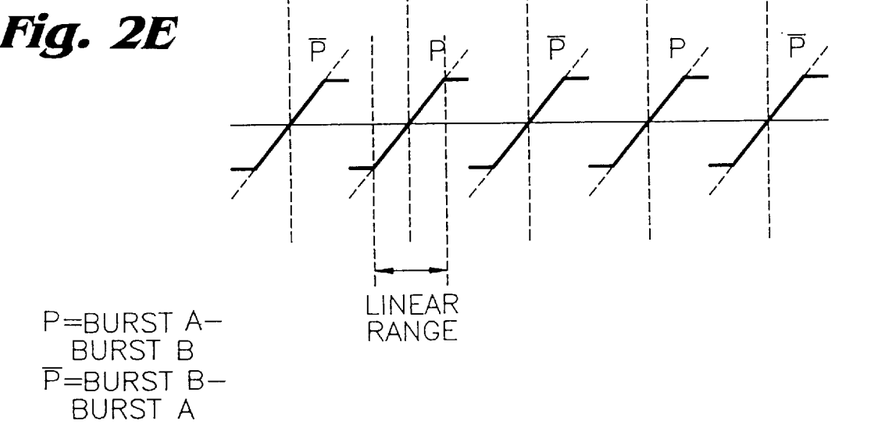

As established earlier, the conventional servo control method contemplates on subtracting the read-out value of the servo burst "B" from that of the servo burst "A" as shown in FIG. 2D, and determining a position error signal value as an absolute value in correspondence with a degree of detecting resolution during the seek mode. For example, if the read-out value of the servo burst "A" is 60, and the read-out value of the servo burst "B" is 40, the difference between the servo burst "A" and "B" derived by subtracting the servo burst "B" from the servo burst "A" is 20, and the current position error signal value read-out by the head 107 is 25.4, or 25 in the disk recording system having 256 resolutions (+127PES to−128PES). The waveform of FIG. 2E shows a linear range as the absolute value of the position error signal for which the position error signal can be reliably reproduced during the track following mode to control the head position over the target track of the disk recording medium. Such a conventional servo control technique, as described earlier, has a number of drawbacks. Since the servo information is in-line with the sector data, the sector length available for storing user data is reduced. This requires for an expansion of data area on the track and reduction of servo code performance time. Moreover, since the average gap width of the head corresponds to approximately 80% to 90%, all data of each target track can not accurately be reproduced without an error, and the position error signal can not be reliably detected to control the head position on a disk recording medium.

Figure 3A:
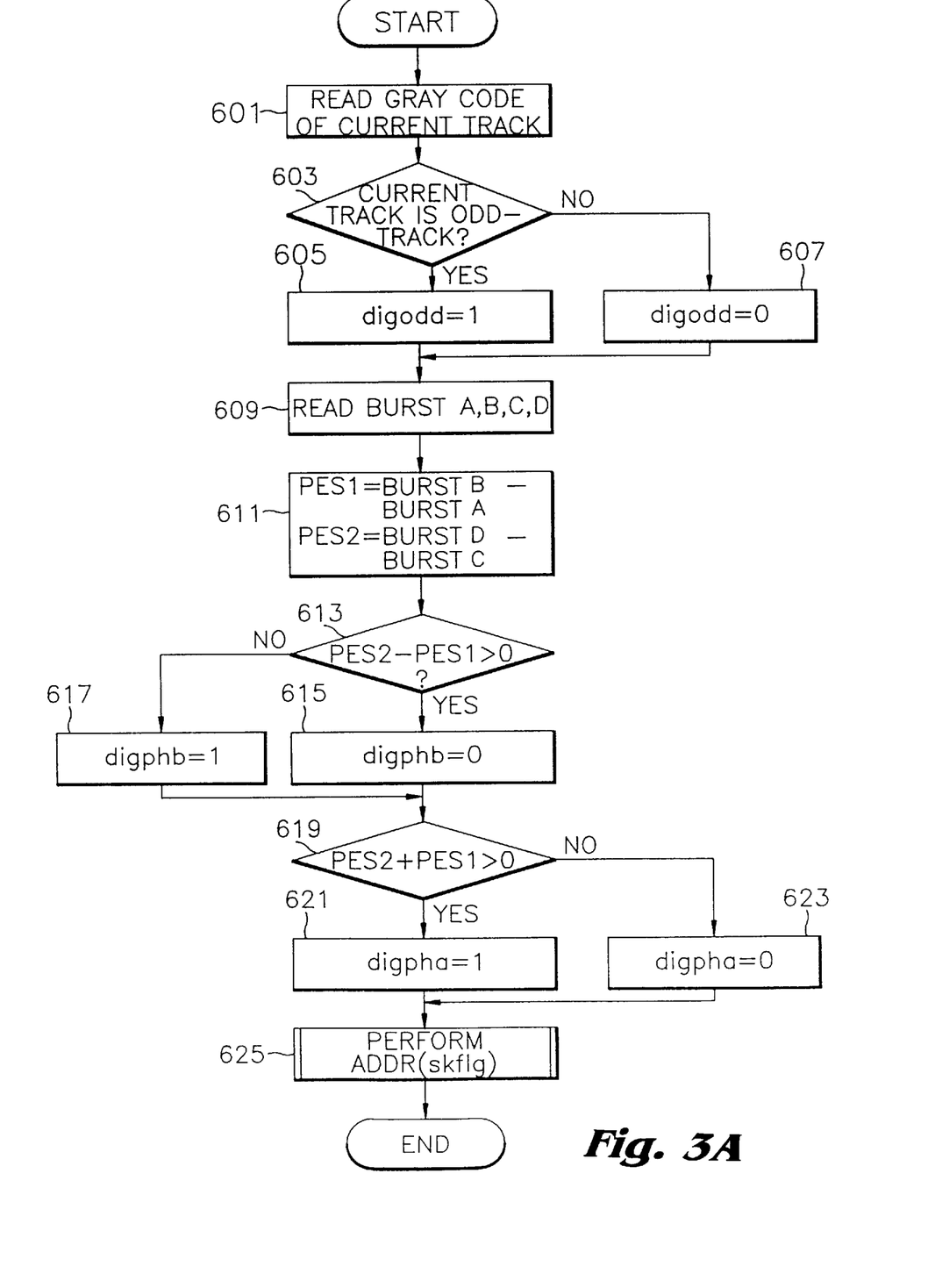
FIG. 3A is a main flow chart.

Referring now to FIGS. 3A to 3I which are flow charts illustrating a process of positioning a head on a disk recording medium according to the principles of the present invention. FIG. 3A is a main flow chart, and FIGS. 3B to 3I illustrate seek information subroutines of FIG. 3A in which a current position of the head is finally updated using variables such as, for example, a current gray code and a current position error signal.

Figure 4A:
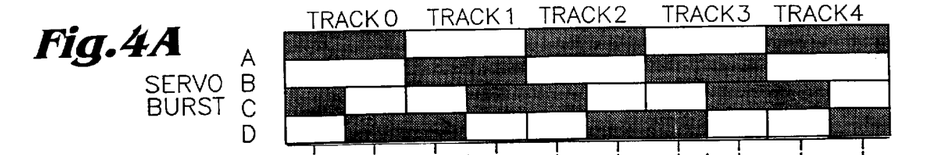
FIGS. 4A to 4G are timing diagrams illustrating the burst recording state and the position error signal generation according to the preferred embodiment of the present invention.
Figure 4B:
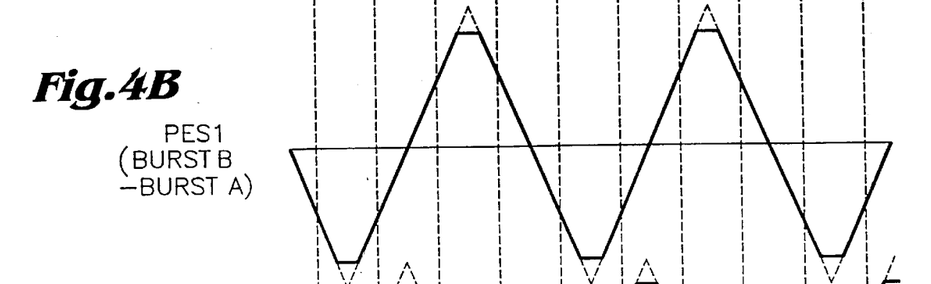
Figure 4C:
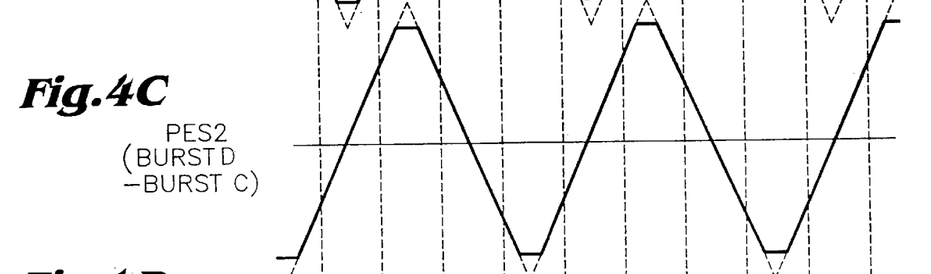

FIGS. 4A to 4G are timing diagrams illustrating the burst recording state and the position error signal generation according to the preferred embodiment of the present invention. FIG. 4A. illustrates a unique servo pattern including four servo bursts "A", "B", "C", "D" embedded on the surface of the disk recording medium as contemplated by the present invention. When the disk recording medium is placed into position on the spindle motor 113 for rotation, the servo bursts "A", "B", "C", "D" are read by the head 107 of FIG. 1 upon initiation of the seek mode, and sampled by the reading decoding and writing encoding unit 123 via the amplifier 121. Once the servo burst "A", "B", "C", "D" are sampled, a first and second position error signals PES1 and PES2 are obtained from the four servo bursts "A", "B", "C", "D". That is, the first position error signal PES1 is obtained from the difference of servo burst "B" and servo burst "A" (PES1=burst B−burst A) as shown in FIG. 4B, and the second position error signal PES2 is obtained from the difference of servo burst "D" and servo burst "C" (PES2= burst D−burst C). The first and second position error signals PES1 and PES2 are then input to the microprocessor 101 via the ADC 125. During the seek mode, the current position of the head is determined using a gray code and a digital-converted value of the PES1 and PES2 of 8 bits, that is, for example, a value equally divided into 256. By contrast, during the track following mode, the position of the head is determined using only the second position error signal PES2.

Figure 4D:
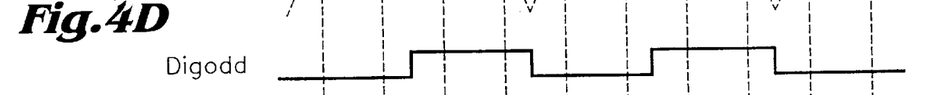
Figure 4E:
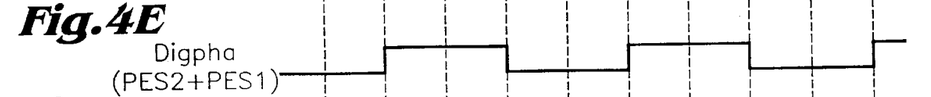
Figure 4F:
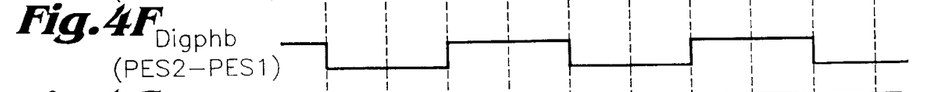
Figure 4G:
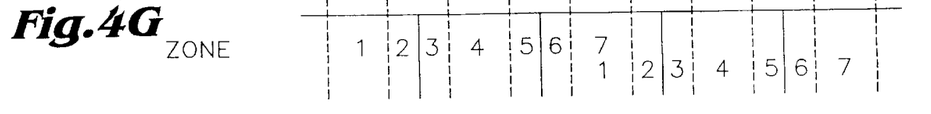

FIG. 4D illustrates odd/even track information Digodd which exhibits a value of "0", when the current track in which the head 107 is positioned is an even track. If, on the other hand, the odd/even track information Digodd exhibits a value of "1", this indicates that the current track in which the head 107 is positioned an odd track. FIGS. 4E and 4F illustrate a waveform of a PES Digpha signal which is the addition of the second and first position error signals PES2 and PES1, and a waveform of a PES Digphb signal which is the difference of the second and first position error signals PES2 and PES1. FIG. 4G illustrates different zones 1 through 7 from which the head 107 can be positioned.

Figure 5:
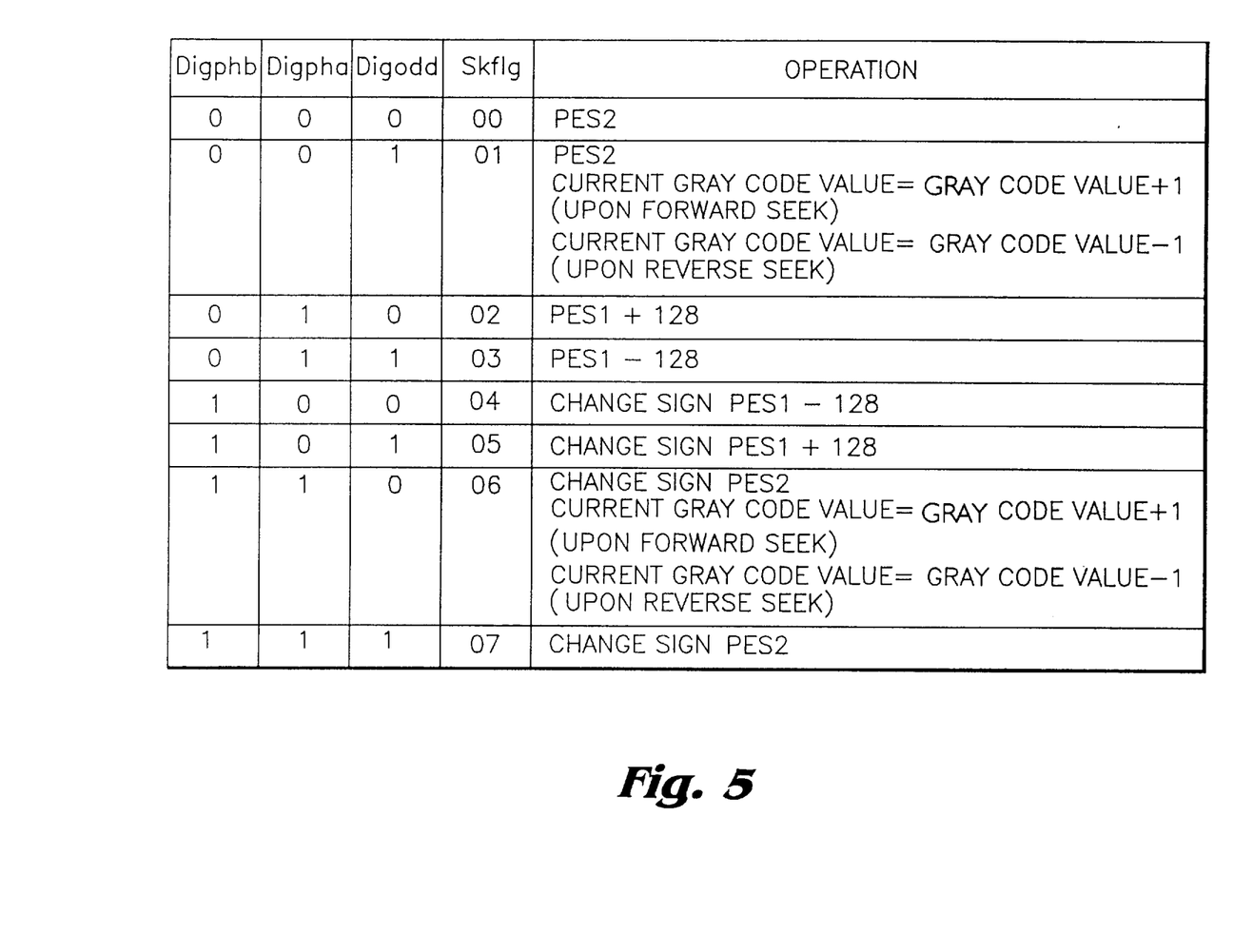
FIG. 5 is a position error signal generation table according to the preferred embodiment of the present invention.

FIG. 5 illustrates a position error signal PES generation table according to the preferred embodiment of the present invention, in which the relationship between the seek information Skflg of eight states where the head 107 can be positioned on N and N+1 tracks, and the selection of the position error signal PES and the determination of the gray code. As shown in FIG. 5, the seek information Skflg is represented by a 3-bit data value comprised of the difference of PES Digphb bit, the addition of PES Digpha bit, and the odd/even track information bit Digodd, successively. The subroutines of FIGS. 3B to 3I are determined in accordance with the seek information Skflg.

For example, when the overall PES value for a single track is divided equally into 256, and the center of the track is defined as "PES=0", the PES value at the boundary between the N track and the N−1 track is −128, and the PES value at the boundary between the N track and the N+1 track is +127. Accordingly, the resolution of PES becomes, for example, 256. In order to calculate the off-track amount of the head on the basis of the center of the track, only the PES2 value is required; but since the exact PES value is not read due to the gap width (for example, 80%) of the head at the boundary between the tracks, the current position of the head is determined by using the PES1 value at a dead zone of the PES2, instead of using the PES2 value, upon the seek mode. The dead zone corresponds to the zones 2, 3, 5, 6 as shown in FIG. 4G. The dead zone indicates the boundary between the tracks, i.e., the regions except for the linear ranges of PES2 value.

In correspondence with the logic state of the seek information Skflg, the method of detecting, the position of the head according to the preferred embodiment of the present invention has the following conditions as shown in FIG. 5.

1) When the seek information Skflg has a 3-bit binary value of "000" which represents zero, the head 107 is positioned on zone 1 as shown in FIG. 4G and the PES2 value is applied to determine the current position error signal PES.

Current PES=PES2

2) When the seek information Skflg has a 3-bit binary value of "001" which represents one, the head 107 is moves from zone 3 to zone 1, or from zone 5 to zone 7 as shown in FIG. 4G while performing the seek mode, and the PES2 value is applied to determine the current position error signal PES. Further, in order to determine a current gray code value in accordance with the seek direction of the head 107, a value of +1 is added to the gray code upon a forward seek, whereas a value of −1 is added to the gray code upon a reverse seek.

Current PES=PES2, and current gray code value=gray code value±1

3) When the seek information Skflg has a 3-bit binary value of "010" which represents two, the head 107 is positioned at zone 2, and since the head is in the dead zone of the PES2, the PES1 value, instead of the PES2 value, is read-out and a corresponding offset value 128 is added to the PES1 value on the basis of the center of track.

Current PES=PES1+128

4) When the seek information Skflg has a 3-bit binary value of "100" which represents three, the head 107 is positioned at zone 3, and since the head is in the dead zone of the PES2, the PES1 value, instead of the PES2 value, is read-out and a corresponding offset value 128 is subtracted from the PES1 value on the basis of the center of track.

Current PES=PES1−128

5) When the seek information Skflg has a 3-bit binary value of "101" which represents four, the head 107 is positioned at zone 6, and since the head is in the dead zone of the PES2, the −PES1 value, instead of the PES2 value, is read-out and a corresponding offset value 128 is subtracted from the −PES1 value on the basis of the center of track.

Current PES=−PES1−128

6) When the seek information Skflg has a 3-bit binary value of "110" which represents five, the head 107 is positioned at zone 5, and since the head is in the dead zone of the PES2, the −PES1 value, instead of the PES2 value, is read-out and a corresponding offset value 128 is added to the −PES1 value on the basis of the center of track.

Current PES=−PES1+128

7) When the seek information Skflg has a 3-bit binary value of "110" which represents six, the head 107 is moves from zone 2 to zone 4, or from zone 6 to zone 4 as shown in FIG. 4G while performing the seek mode, and the −PES2 value is applied to determine the current position error signal PES. Further, in order to determine the current gray code value in accordance with the seek direction of the head, a value of +1 is added to the gray code upon the forward seek, whereas a value of −1 is added to the gray code upon the reverse seek.

Current PES=−PES2, and current gray code value=gray code value±1

8) When the seek information Skflg has a 3-bit binary value of "111" which represents seven, the head 107 is positioned in zone 4 as shown in FIG. 4G and the −PES2 value is applied to determine the current position error signal PES.

Current PES=−PES2.

A process of detecting a current position error signal PES of FIGS. 3A to 3I for positioning the head on a target track of a disk recording medium according to the preferred embodiment of the present invention will now be described with reference to FIGS. 4 and 5 as follows.

Refering to FIG. 3A, the microprocessor 101 reads the gray code of the current track in which the head is positioned over on a disk recording medium via the gate array 127 at step 601. Once the gray code of the current track is read, the microprocessor 101 determines whether current track is either an odd track or an even track at step 603 from the gray code. If the current is not an odd track, the odd/even track information Digodd is set to "0" at step 607. By contrast, if the current track is an odd track, the odd/even track information Digodd is set to "1" at step 605.

After the current track is determined to be one of an odd track and an even track, the microprocessor 101 receives the read-out value of the servo bursts "A", "B", "C", "D" input through the reading decoding and writing encoding unit 123 and the ADC 125 at step 609, and obtains the values of the first and second position error signals PES1 and PES2 in order to generate the addition of PES Digpha and the difference of PES Digphb as timing pulses at step 611.

Thereinafter, the microprocessor 101 subtracts the PES1 from the PES2 at step 613. If the subtracted value is more than "0", the difference of PES Digphb is determined as "0" at step 615. If the subtracted value is less than "0" however, the difference of PES Digphb is determined as "1" at step 617. The microprocessor 101 then adds the PES2 to the PES1 at step 619. If the added value is more than "0", the addition of PES Digpha is determined as "1" at step 621. If, however, the added value is less than "0", the addition of PES Digpha is determined as "1" at step 623.

At step 625, the microprocessor 101 performs the subroutines shown in FIGS. 3B to 3I in accordance with the 3-bit binary value of the seek information Skflg which comprises a PES, Digphb bit representing the difference between PES2 and PES1, a PES Digpha bit representing the addition of PES2 and PES1, and an odd/even track information bit Digodd representing whether the current track is one of an odd or even track in order to determine the current position error signal PES for obtaining a more accurate servo control.

Figure 3B:
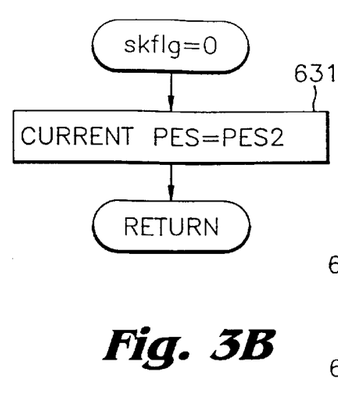
FIGS. 3B to 3I are flow charts illustrating respective seek information subroutines at step 625 of FIG. 3A.

That is, when the seek information Skflg is zero (i.e., the 3-bit binary value of "000") as shown in FIG. 3B, the microprocessor 101 sets the second position error signal PES2 as the current position error signal PES at step 631 for positioning the head on a data line of the target track of a disk recording medium, completes the subroutine and returns to the main program as shown in FIG. 3A for termination.

Figure 3C:
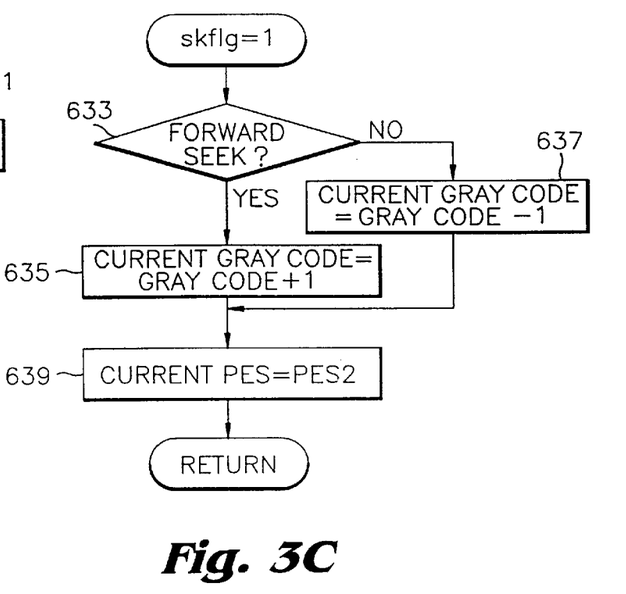

When the seek information Skflg is one (i.e., the 3-bit binary value of "001") as shown in FIG. 3C, the microprocessor 101 determines a current seek direction of the head 107 at step 633. At this point, if the head 107 is determined in the forward seek, the microprocessor 101 increases, at step 635, the gray code read from the current track at step 601 of FIG. 3A by one, and sets the increased gray code as the current gray code. By contrast, if the head 107 is determined in the reverse seek, the microprocessor 101 decreases, at step 637, the gray code read from the current track at step 601 of FIG. 3A by one, and sets the decreased gray code as the current gray code. After that, the microprocessor 101 sets the second position error signal PES2 as the current position error signal PES for positioning the head on the data line of the target track of a disk recording medium, and completes the subroutine thereof.

Figure 3D:
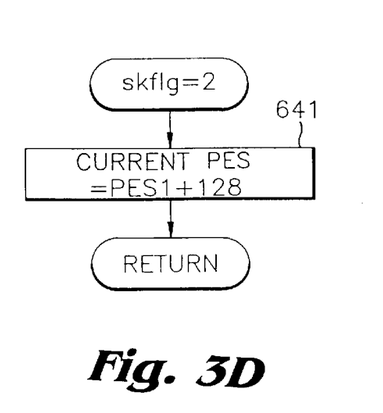

When the seek information Skflg is two (i.e., the 3-bit binary value of "010") as shown in FIG. 3D, the microprocessor 101 adds an offset value 128 to the first position error signal PES1 at step 641, sets the added value as the current position error signal PES for positioning the head or the data line of the target track of a disk recording medium, and completes the subroutine in order to return to the main program as shown in FIG. 3A for termination.

Figure 3E:
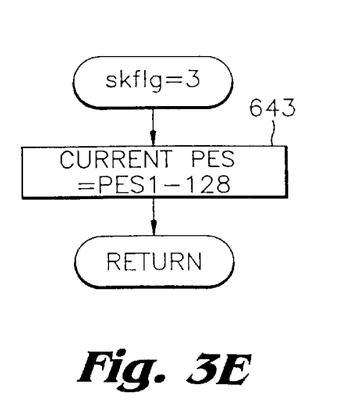

When the seek information Skflg is three (i.e., the 3-bit binary value of "011") as shown in FIG. 3E, the microprocessor 101 subtracts the offset value 128 from the first position error signal PES1 at step 643, sets the subtracted value as the current position error signal PBS for positioning the head on the data line of the track of a disk recording medium, and completes the subroutine in order to return to the main program as shown in FIG. 3A for termination.

Figure 3F:
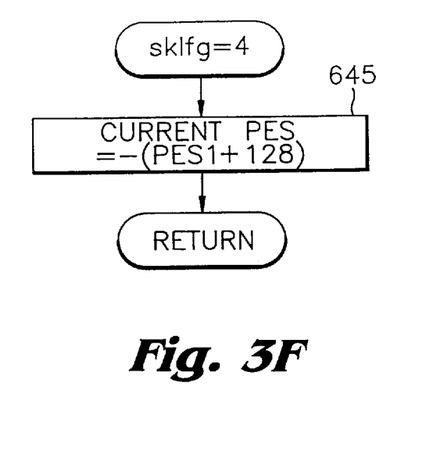

When the seek information Skflg is four (i.e., the 3-bit binary value of "100") as shown in FIG. 3F, the microprocessor 101 subtracts the offset value 128 from the negative of the first position error signal −PES1 at step 645, sets the subtracted value as the current position error signal PES for positioning the head on the data line of the target track of a disk recording medium, and completes the subroutine in order to return to the main program as shown in FIG. 3A for termination.

Figure 3G:
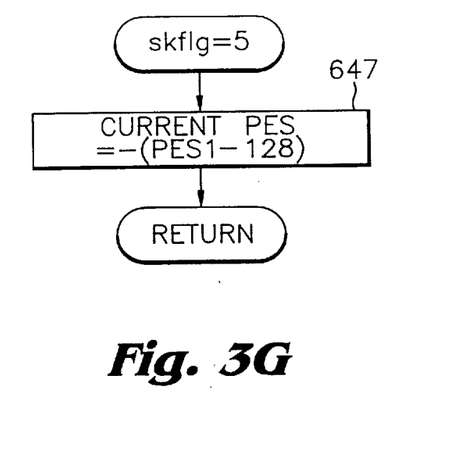

When the seek information Skflg is five (i.e., the 3-bit binary value of "101") as shown in FIG. 5G, the microprocessor 101 adds an offset value 128 to the −PES1 at step 647, sets the added value as the current position error signal PES for positioning the head on the data line of the target track of a disk recording medium, and completes the subroutine in order to return to the main program as shown in FIG. 3A for termination.

Figure 3H:
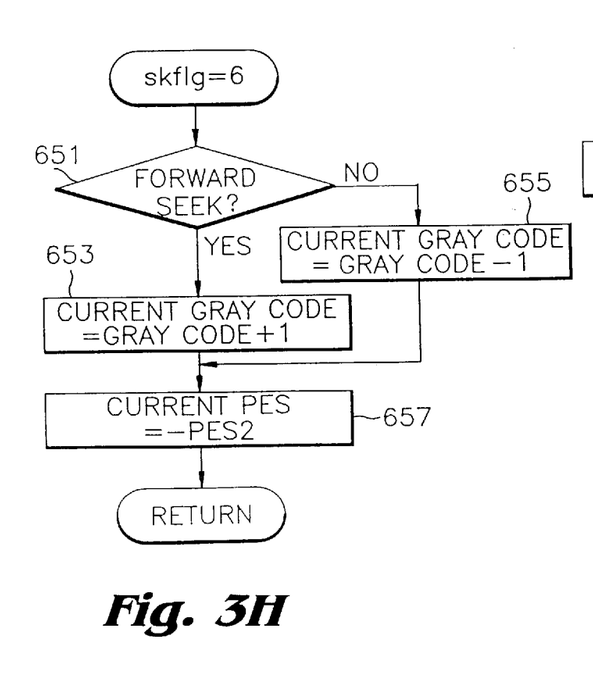

When the seek information Skflg is six (i.e., the 3-bit binary value of "110") as shown in FIG. 3H, the microprocessor 101 determines a current seek direction of the head at step 651. At this point, if the head 107 is determined in the forward seek, the microprocessor 101 increases, at step 653, the gray code read from the current track at step 601 of FIG. 3A by one, and sets the increased gray code as the current gray code. By contrast, if the head 107 is determined in the reverse seek, the microprocessor 101 decreases, at step 655, the gray code read from the current track at step 601 of FIG. 3A by one, and sets the decreased gray code as the current gray code. After that, the microprocessor 101 sets the negative of the second position error signal −PES2 as the current position error signal PES for positioning the head on the data line of the target track of a disk recording medium, and completes the subroutine thereof.

Figure 3I:
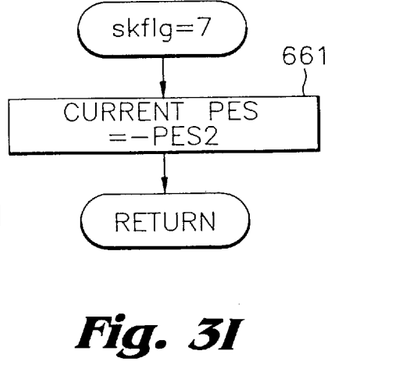

When the seek information Skflg is seven (i.e., the 3-bit binary value of "111") as shown in FIG. 3I, the microprocessor 101 sets the negative of the second position error signal −PES2 as, the current position error signal PES at step 661 for positioning the head on the data line of the target track of a disk recording medium, and completes the subroutine in order to return to the main program as shown in FIG. 3A for termination.

As set forth in the above description, a method according to the present invention is capable of accurately detecting the position of the head on the track irrespective of the dead zone between the tracks by using the seek information achieved by the above steps 601 through 625. Moreover, the method is capable of detecting the position of the head upon the seek mode or track following mode in order to obtain a more exact servo control.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A digital servo control method of detecting a position of a head in a disk recording system using a disk recording medium containing a servo burst recording region comprising a plurality of servo bursts, said method comprising the steps of:

reading track identification information and servo burst information on a current track of said disk recording medium in which the head is positioned;

determining whether the current track is one of an odd and even track from said track identification information read from the current track of said disk recording medium and generating an odd/even information bit in dependence upon said determination;

generating first and second position error signals from said servo burst information read from the current track of said disk recording medium;

obtaining seek information from addition and subtraction of the first and second position error signals and from said odd/even information bit; and correcting said track identification information in correspondence with said seek information and outputting a current position error signal to position the head on a target track of the disk recording medium.

2. The method of claim 1, further comprised of said servo burst recording region of said disk recording medium comprising first, second, third, and fourth servo bursts, and said first position error signal being determined from said first and second servo bursts and said second position error signal being determined from said third and fourth servo bursts.

3. The method of claim 2, further comprised of said first and second position error signals being respectively calculated by a difference of said first burst from said second burst and a difference of said third burst from said fourth burst.

4. The method of claim 3, further comprised of said seek information comprising three binary bits with a first binary bit of one of "1" and "0" representing the difference of said first position error signal from said second position error signal, a second binary bit of one of "1" and "0" representing the addition of said first and second position error signals, and a third binary bit being said odd/even information bit of one of "0" and "1".

5. The method of claim 4, further comprised of setting the second position error signal as the current position error signal for positioning the head on the target track of said disk recording medium, when the three binary bits of said seek information exhibit a discrete value of zero.

6. The method of claim 5, further comprised of determining a current seek direction of the head, changing a value of said track identification information read from the current track by one based on said determination, and setting the second position error signal as the current position error signal for positioning the head on the target track of said disk recording medium, when the three binary bits of said seek information exhibit a discrete value of one.

7. The method of claim 6, further comprised of combining a value of the first position error signal with a predetermined value and setting a combined result as the current position error signal for positioning the head on the target track of said disk recording medium, when the three binary bits of said seek information exhibit a discrete value of two.

8. The method of claim 7, further comprised of subtracting said predetermined value from the value of said first position error signal and setting a subtracted result as the current position error signal for positioning the head on the target track of said disk recording medium, when the three binary bits of said seek information exhibit a discrete value of three.

9. The method of claim 8, further comprised of combining the value of said first position error signal with said predetermined value and setting the negative of a combined result as the current position error signal for positioning the head on the target track of said disk recording medium, when the three binary bits of said seek information exhibit a discrete value of four.

10. The method of claim 9, further comprised of subtracting said predetermined value from the value of said first position error signal and setting the negative of a subtracted result as the current position error signal for positioning the head on the target track of said disk recording medium, when the three binary bits of said seek information exhibit a discrete value of five.

11. The method of claim 9, further comprised of determining a current seek direction of the head, changing a value of said track identification information read from the current track by one based on said determination, and setting the negative of the second position error signal as the current position error signal for positioning the head on the target track of said disk recording medium, when the three binary bits of said seek information exhibit a discrete value of six.

12. The method of claim 11, further comprised of setting the negative of the second position error signal as the current position error signal for positioning the head on the target track of said disk recording medium, when the three binary bits of said seek information exhibit a discrete value of seven.

13. The method of claim 1, further comprised of said seek information being obtained by the steps of:
  obtaining an addition of said first and second position error signals and generating a first sign bit corresponding to a compared state with said addition on the basis of a value of "0";
  obtaining a difference of said first position error signals from said second position error signal and generating a second sign bit corresponding to a compared state with said difference on the basis of a value of "0"; and
  combining said odd/even information bit and said first and second sign bits to obtain said seek information comprising at least three binary bits.

14. A servo control method of detecting a position of a head on a disk recording medium having a plurality of concentrically spaced data tracks, each data track including a plurality of circumferential data sectors and a plurality of circumferential servo sectors disposed therebetween, each servo sector having recorded therein servo information in the form of servo bursts "A", "B", "C" and "D", and said data track also including GRAY code preceding said servo sectors, said servo control method comprising the steps of:
  reading the GRAY code of the current data track in which the head is positioned on the disk recording medium;
  making a determination of whether the current data track is one of an odd and even track from the GRAY code, and generating an odd/even information bit in accordance with said determination;
  reading said servo bursts "A", "B", "C" and "D" recorded on a corresponding servo sector of the current data track of said disk recording medium;
  obtaining a first position error signal from said servo bursts "A" and "B", and a second position error signal from said servo bursts "C" and "D";
  obtaining seek information from said odd/even information bit and said first and second position error signals; and
  correcting the GRAY code read from the current data track in correspondence with said seek information and outputting a current position error signal for positioning the head on a data line of the current data track.

15. The servo control method of claim 14, further comprised of said seek information comprising three binary bits with a first binary bit of one of "1" and "0" representing the difference of said first position error signal from said second position error signal, a second binary bit of one of "1" and "0" representing the addition of said first and second position error signals, and a third binary bit being said odd/even information bit of one of "0" and "1".

16. The servo control method of claim 15, further comprised of setting the second position error signal as the current position error signal for positioning the head on the data line of the current data track of said disk recording medium, when the three binary bits of said seek information exhibit a discrete value of zero.

17. The servo control method of claim 16, further comprised of determining a current seek direction of the head, changing a value of said GRAY code from the current data track by one based on the current seek direction of the head, and setting the second position error signal as the current position error signal for positioning the head on the data line of the current data track of said disk recording medium, when the three binary bits of said seek information exhibit a discrete value of one.

18. The servo control method of claim 17, further comprised of combining a value of the first position error signal with a predetermined value and setting a combined result as the current position error signal for positioning the head on the data line of the current data track of said disk recording medium, when the three binary bits of said seek information exhibit a discrete value of two.

19. The servo control method of claim 18, further comprised of subtracting said predetermined value from the value of said first position error signal and setting a subtracted result as the current position error signal for positioning the head on the data line of the current data track of said disk recording medium, when the three binary bits of said seek information exhibit a discrete value of three.

20. The servo control method of claim 19, further comprised of combining the value of said first position error signal with said predetermined value and setting the negative of a combined result as the current position error signal for positioning the head on the data line of the current data track of said disk recording medium, when the three binary bits of said seek information exhibit a discrete value of four.

21. The servo control method of claim 20, further comprised of subtracting said predetermined value from the value of said first position error signal and setting the negative of a subtracted result as the current position error signal for positioning the head on the data line of the current track of said disk recording medium, when the three binary bits of said seek information exhibit a discrete value of five.

22. The servo control method of claim 21, further comprised of determining a current seek direction of the head, changing a value of said GRAY code read from the current track by one based on the current seek direction of the head, and setting the negative of the second position error signal as the current position error signal for positioning the head on the data line of the current data track of said disk recording medium, when the three binary bits of said seek information exhibit a discrete value of six.

23. The servo control method of claim 22, further comprised of setting the negative of the second position error signal as the current position error signal for positioning the head on the data line of the current data track of said disk recording medium, when the three binary bits of said seek information exhibit a discrete value of seven.

24. A digital servo control apparatus of detecting a position of a head on a disk recording medium having a plurality of concentrically spaced data tracks, each data track including a plurality of circumferential data sectors and a plurality of circumferential servo sectors disposed therebetween, each servo sector having recorded therein servo information in the form of servo bursts "A", "B", "C" and "D", and said data track also including GRAY code preceding said servo sectors, said digital servo control apparatus comprising:

position signal generating means for generating a current position error signal by:

reading the GRAY code of the current data track in which the head is positioned on the disk recording medium;

making a determination of whether the current data track is one of an odd and even track from the GRAY code, and generating an odd and even information bit in accordance with said determination;

reading said servo bursts "A", "B", "C" and "D" recorded on a corresponding servo sector of the current data track of said disk recording medium;

obtaining a first position error signal from said servo bursts "A" and "B", and a second position error signal from said servo bursts "C" and "D";

obtaining seek information from said odd and even information bit and said first and second position error signals; and         correcting the GRAY code read from the current data track in correspondence with said seek information and outputting said current position error signal; and     servo means for positioning the head on a data line of the current data track in response to said current position error signal.

25. A servo control apparatus for a disk drive system, comprising:

a disk recording medium having a plurality of concentrically spaced data tracks, each data track including a plurality of circumferential data sectors and a plurality of circumferential servo sectors disposed therebetween, each servo sector having recorded therein servo information in a quadrature servo pattern of first, second, third and fourth servo bursts where said first burst is initiated at a mid point of said third burst of a preceding quadrature servo pattern, said second burst is initiated at a termination point of said first burst, said fourth burst is initiated at a mid point of said first burst and said third burst is initiated at a termination point of said fourth burst and is terminated at a mid point of a first burst of a following quadrature servo pattern, and said data track also including GRAY code preceding said servo sectors; and     a position generator for generating, from said quadrature servo pattern of servo bursts and the GRAY code of a current data track read by a transducer head in said drive disk system, a current position error signal for positioning the transducer head on a data line of the current data track of said disk recording medium by:

reading the GRAY code of the current data track in which the head is positioned on the disk recording medium;

making a determination of whether the current data track is one of an odd and even track from the GRAY code, and generating an odd/even information bit in accordance with said determination;

reading said quadrature servo pattern recorded on a corresponding servo sector of the current data track of said disk recording medium,         obtaining a first position error signal from a difference of said first and second bursts, and a second position error signal from a difference of said third and fourth bursts;

obtaining seek information from said odd/even information bit and said first and second position error signals; and         correcting the GRAY code read from the current data track in correspondence with said seek information and generating said current position error signal for positioning the head on a data line of the current data track.

26. The servo control apparatus of claim 25, further comprised of said seek information comprising three binary bits with a first binary bit of one of "1" and "0" representing the difference of said first position error signal and said second position error signal, a second binary bit of one of "1" and "0" representing the addition of said first and second position error signals, and a third binary bit corresponding to said odd/even information bit of one of "0" and "1".

27. A servo control apparatus for a disk drive system, comprising:

a disk recording medium having a plurality of concentrically spaced data tracks, each data track including a plurality of circumferential data sectors and a plurality of circumferential servo sectors disposed therebetween, each servo sector having recorded therein servo information in a quadrature servo pattern of first, second, third and fourth servo bursts, and said data track also including GRAY code preceding said servo sectors; and     a position generator for generating, from said quadrature servo pattern of said first, second, third and fourth servo bursts and the GRAY code of a current data track read by a transducer head in said drive disk system, a current position error signal for positioning the transducer head on a data line of the current data track of said disk recording medium, said position generator generating said current position error signal by first:

obtaining a first position error signal from a difference of said first and second servo bursts, and a second position error signal from a difference of said third and fourth servo burst;

obtaining seek information from the GRAY code of the current data track read by said head and said first and second position error signals;

setting the second position error signal as the current position error signal for positioning the head on the data line of the current data track of said disk recording medium, when said seek information comprised of three binary bits exhibits a discrete value of zero;

determining a current seek direction of the head, changing a value of said GRAY code from the current data track by a discrete value based on the current seek direction of the head, and setting the second position error signal as the current position error signal for positioning the head on the data line of the current data track of said disk recording medium, when said seek information comprised of said three binary bits exhibits a discrete value of one;

combining a value of the first position error signal with a predetermined value and setting a combined result as the current position error signal for positioning the head on the data line of the current data track of said disk recording medium, when said seek information comprised of said three binary bits exhibits a discrete value of two;

subtracting said predetermined value from the value of said first position error signal and setting a subtracted result as the current position error signal for positioning the head on the data line of the current data track of said disk recording medium, when said seek information comprised of said three binary bits exhibits a discrete value of three;

combining the value of said first position error signal with said predetermined value and setting the negative of a combined result as the current position error signal for positioning the head on the data line of the current data track of said disk recording medium, when said seek information comprised of said three binary bits exhibits a discrete value of four;

subtracting said predetermined value from the value of said first position error signal and setting the negative of a subtracted result as the current position error signal for positioning the head on the data line of the current track of said disk recording medium, when said seek information comprised of said three binary bits exhibits a discrete value of five;

determining a current seek direction of the head, changing a value of said GRAY code read from the current track by one based on the current seek direction of the head, and setting the negative of the second position error signal as the current position error signal for positioning the head on the data line of the current data track of said disk recording medium, when said seek information comprised of said three binary bits exhibits a discrete value of six; and setting the negative of the second position error signal as the current position error signal for positioning the head on the data line of the current data track of said disk recording medium, when said seek information comprised of said three binary bits exhibits a discrete value of seven.

* * * * *